June 13, 1961     G. TANNER     2,988,442
REDUCTION OF IRON ORE BY HYDROCARBONS
Filed March 17, 1959
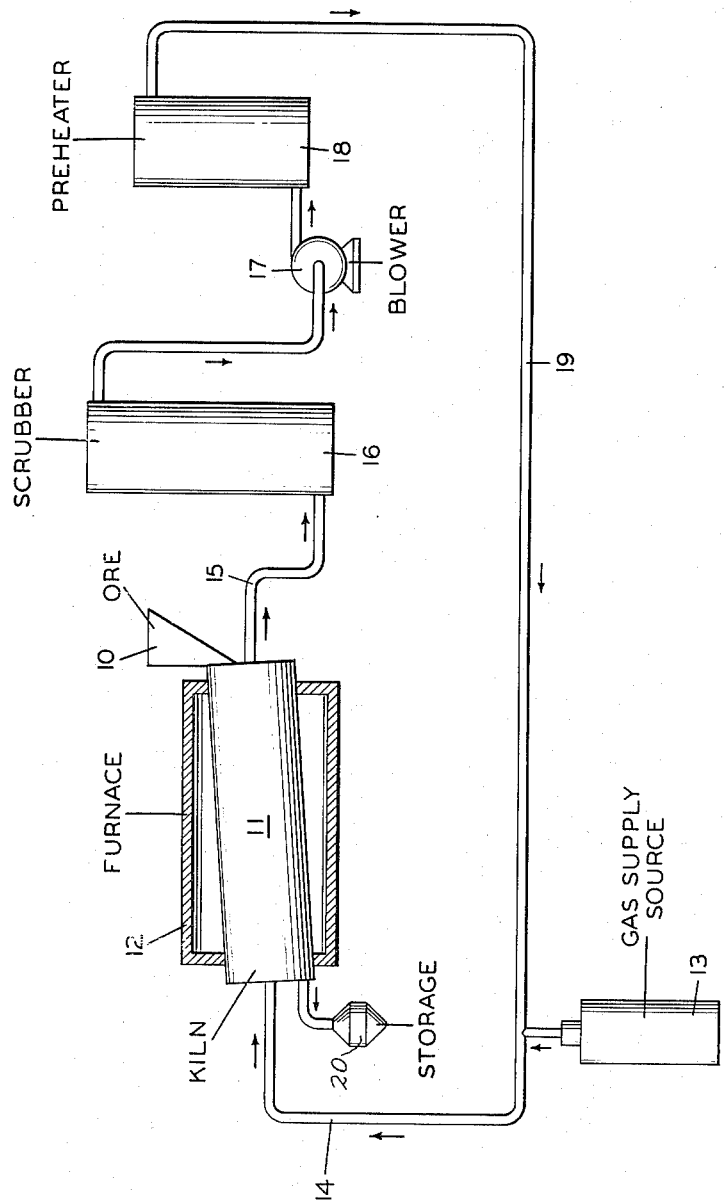

United States Patent Office 2,988,442
Patented June 13, 1961

2,988,442
REDUCTION OF IRON ORE BY HYDROCARBONS
Gustaf Tanner, Storbogatan 12, Avesta, Sweden
Filed Mar. 17, 1959, Ser. No. 799,975
Claims priority, application Sweden Mar. 20, 1958
3 Claims. (Cl. 75—34)

This invention relates to the beneficiation or reduction of metallic oxides and it relates particularly to the reduction of iron ores by means of hydrocarbon gases.

At the present time, practically all iron is produced by reduction of iron ore with coke in a blast furnace. The increasing consumption of iron together with relatively few discoveries of suitable coking coal throughout the world has lead to an increasing demand on the mines producing coking coals with the result that such coals have become more costly. In many countries where there are valuable deposits of iron ore, coking coal is not locally available. Due to the decrease in availability and increase in the cost of coking coals, much research has been conducted to determine whether iron ores can be reduced economically and efficiently with other reducing agents, such as, hydrocarbon gases. Direct reduction with hydrocarbon gases has not been found to be very practical and, accordingly, most of the effort has been directed toward the development of plants for the synthesis of reducing gases containing hydrogen and carbon monoxide from hydrocarbons. Hydrogen and carbon monoxide and mixtures of the same are satisfactory, under certain conditions, for reducing iron ores. Hydrogen is preferable to carbon monoxide for the reason that the reducing action with hydrogen can take place at lower temperatures where sticking or agglomerating of the ore can be avoided. When iron oxides are reduced with hydrogen, the reaction velocity increases with rising temperatures up to about 570° to 580° C. Above this temperature, the reaction velocity decreases and then increases again at still higher temperatures. At about 900° C. the reaction velocity is greater than at about 570° to 580° C. It appears that the change in a reducing velocity is connected with the fact that reduction at temperatures over 570° C. produces ferrous oxide as an intermediary product whereas at lower temperatures, magnetite is reduced directly to iron. The velocity is substantially constant until 60% of the oxygen has been removed from the oxide but it then decreases rapidly when the degree of reduction exceeds 75% to 80% reaching zero at 100% metallization.

Inasmuch as the partially reduced ore sticks or agglomerates at temperatures on the order of 900° C. or above it is impractical if not impossible to reduce finely divided ores with hydrogen at such high temperatures.

It is also recognized that iron oxides are not reducible by contact with carbon at temperatures as low as 570° to 580° C. A practical and efficient reducing rate is attained only at temperatures above 900° C. All of these factors have had a bearing directly or indirectly upon the problem of reducing iron ores directly with hydrocarbon gases.

In accordance with the present invention, I have provided a process in which hydrocarbon gases can be cracked or decomposed efficiently into carbon and hydrogen by bringing the gases into contact with partially reduced iron ore containing metallic iron heated to a temperature in the vicinity of 530 to 580° C., the hydrogen and carbon both being used in the reduction of the ore to metal.

More particularly, the process according to the present invention includes three closely related steps or stages involving (1) decomposition of the hydrocarbon gas using metallic iron as a catalyst whereby hydrogen and carbon are obtained; (2) removing between about 40% and 80% of the oxygen from the oxide and forming metallic iron by reduction of iron oxide at a temperature between about 500 and 580° C., with the hydrogen produced by the catalytic decomposition of the hydrocarbon; and (3) the completing of the reduction of the iron oxide by heating the mixture of iron oxide, metallic iron and carbon to at least 900° C. to cause the carbon to react with the oxides.

For a better understanding of the present invention reference may be had to the accompanying drawings, in which the single figure is a schematic illustration of a suitable apparatus for practicing the present invention.

As shown in the drawing, an iron oxide, such as iron ore in a finely divided state is introduced by means of a hopper 10 into an inclined rotary kiln 11. Inwardly extending bars or pins (not shown) may be provided in the kiln to agitate the ore as it travels along the kiln. A furnace chamber 12 enclosing the kiln is heated by means of a gas or oil burner or the like to maintain the kiln at a suitable reaction temperature. A hydrocarbon gas, such as for example, natural gas or a mixture of propane and butane is introduced from a storage tank or other source 13 into the left-hand end of the rotary kiln 11 by means of a feed pipe 14 so that the ore travels along the kiln countercurrent to the direction of flow of the hydrocarbon gas. Spent gas is discharged through a conduit 15 at the right-hand end of the kiln into the dust collector and scrubber 16 where the gas is cleaned. Gas is discharged from the scrubber by means of a blower 17 and supplied to a preheater 18 where it is heated prior to return to the conduit 19 for admixture with gas from the fresh gas source 13.

In the above-described system, the hot reducing gas supplied to the kiln 11 comes in contact with heated reduced ore containing metallic iron which is a highly effective catalyst for cracking or decomposing the hydrocarbon to deposit carbon in the partially reduced product travelling along the kiln and being discharged into a receiving bin 20. Hydrogen released by cracking of the hydrocarbon flows countercurrent to and in intimate contact with the ore in the kiln and removes between about 40% and 80% of the oxygen from the oxide at the temperature maintained in the rotary kiln 11. When the temperature is between about 500° C. and 580° C., hydrogen is an efficient reducing agent.

In the operation described, the amount of hydrogen consumed during the initial reduction of the ore partially to metallic iron is generally proportional to the amount of carbon produced. Thus, if the reduction of the iron is increased in the early stages of the operation, more carbon will be deposited in the ore. The hydrogen reduction should be controlled to obtain a desired relation between the residual oxygen and the precipitated carbon. Control of the reducing operation can be affected by regulating the time of residence of the oxide in the kiln or by over reducing in the preliminary stages and then adding an ore concentrate to compensate for the amount of carbon present in the product discharged from the kiln 11. For example, if a magnetite concentrate containing 71.3% of iron is reduced by means of a propane-butane gas mixture so that 57% of the oxygen is removed, so much carbon will be precipitated in the partially reduced ore that when the ore is completely reduced and melted, it will have a carbon content of about 0.5%. Thus, the carbon deposited in the product by cracking of the hydrocarbon is sufficient to remove all of the remaining oxygen and give the product a relatively high carbon content.

The spent gas which is discharged from the kiln 11 contains between about 40 and 52.9% hydrogen, about 8% of water and the remainder, uncatalyzed hydrocarbon gas. Therefore, when spent gas is passed through the scrubber and preheater, it can be recirculated with additional hydrocarbon to utilize the gas efficiently.

At the temperature of operation of the kiln, i.e., 500° C. to 580° C., the particles of the product do not stick together. Any slight tendency to sticking of the metallic particles is overcome by providing appropriate agitating rods or bars in the kiln or by introducing a few light grinding bodies into the kiln.

In a typical operation, a magnetite concentrate containing 71.3% Fe and 0.004% S ground having a fineness such that 95% passes through a 100 mesh screen was supplied at a uniform feed rate to the kiln 11 which was heated by means of an oil burner in the furnace chamber 12. A reducing gas consisting of about 50% propane and 50% butane was introduced into the kiln at a temperature of about 600° C. The mixture of partially reduced oxide and carbon and the gas leaving the kiln were maintained at a temperature between about 550 and 570° C. Analysis of the gas leaving the kiln shows that it contained 40% to 41% hydrogen, 8% water and the rest undecomposed hydrocarbons. The gas was cooled in the scrubber to about 20° C. and then was reheated to about 600° C. before returning it to the kiln. During the operation, 57% of the oxygen in the concentrate was removed and the partially reduced concentrate discharged to the storage bin 20 contained 8.6% carbon and .014 to .017% sulphur. The end product in the storage bin was pelletized and was melted on top of molten steel in an induction furnace where the carbon reacted with the remaining iron oxide to produce metallic iron. The carbon content of the product was 0.5%.

150 cubic meters of hydrocarbon gas was used for the reduction of 1336 kg. of the magnetite concentrate. In addition, 152 kg. of fuel oil were consumed in the furnace chamber 12 for heating the kiln 11.

In other typical operations, it has been determined that the consumption of hydrocarbon gas (propane and butane) is about 0.175 kg. of gas per kg. of iron at a temperature between about 550 and 570° C. in the kiln. The circulating gas contains an average of about 45% hydrogen with a maximum concentration of about 52.9%.

The product discharged from the kiln to storage has a grade of reduction between about 52% and 76.4% and a carbon content between about 8% and 12½%.

Subsequent reduction of the partially reduced carbon-containing product can be accomplished in a blast furnace, cupola, low-shaft furnace, electric steel furnace or any other equivalent means. Usually it is advantageous to pelletize or form the product into lumps or briquettes to facilitate processing. On the other hand, if a sponge iron is to be produced, final reduction can be performed in the manner disclosed in U.S. Patent No. 2,596,877 or by any other suitable means.

It will be clear that the process described above can be practiced with a minimum of relatively simple and inexpensive equipment and that it can be used economically in those areas where coking coals are not available and under conditions where expensive gas reforming or synthesizing plants are not commercially feasible or available.

It will be understood that the process is susceptible to variation and that the size and arrangement of the kiln and other gas treating apparatus may be modified substantially without departing from the invention.

Accordingly, the form of the invention described above should be considered as illustrative and not as limiting the scope of the following claims.

I claim:

1. A process for reducing iron oxides comprising advancing and agitating a stream of heated particles of iron oxide and metallic iron, directing a heated hydrocarbon gas countercurrent to said stream and into contact with the particles, maintaining the temperature of said particles between about 500° C. and 580° C. to decompose said hydrocarbon gas partially by contact with the metallic iron to form hydrogen and deposit carbon in said stream, said hydrogen reacting with said iron oxides to form additional metallic iron, forming said carbon containing stream of particles into pellets and heating said carbon-containing pellets to a temperature of at least 900° C. to convert the iron oxide remaining in said pellets substantially completely to metallic iron.

2. The process set forth in claim 1 in which said hydrogen reacts with said iron oxides to reduce about 40% to about 80% of the iron oxide to metallic iron.

3. The process set forth in claim 1 comprising recirculating the gas countercurrent to said stream and adding fresh hydrocarbon gas thereto.

References Cited in the file of this patent

UNITED STATES PATENTS

| | | |
|---|---|---|
| 1,795,681 | Rowlands | Mar. 10, 1931 |
| 2,296,522 | Hartley | Sept. 22, 1942 |
| 2,417,949 | Riveroll | Mar. 25, 1947 |